J. H. PARKHURST.
Thill Couplings.

No. 139,022.  Patented May 20, 1873.

Witnesses
Jas. L. Ewin
Walter Allen

Inventor.
Jas. H. Parkhurst
By Knight Bros
Attorneys

UNITED STATES PATENT OFFICE.

JAMES H. PARKHURST, OF ST. LOUIS, MISSOURI.

IMPROVEMENT IN THILL-COUPLINGS.

Specification forming part of Letters Patent No. 139,022, dated May 20, 1873; application filed September 13, 1872.

*To all whom it may concern:*

Be it known that I, JAMES H. PARKHURST, of St. Louis, in the county of St. Louis, and State of Missouri, have invented certain Improvements in Thill-Couplings, of which the following is a specification:

Nature and Object of the Invention.

The first part of my invention consists in providing the thill-iron with an eccentric head or pintle, which rotates in a slotted box, and, by reason of its eccentricity, is made to press upon a rubber seat to prevent rattling. The second part of my invention consists in the employment of an open washer, provided with a projection on one of its ends, which is rotated by the thill-iron, after the insertion of the latter into its bearings, and serves as a guard to prevent the withdrawal of the thill-head from its bearings.

General Description.

Figure 1:
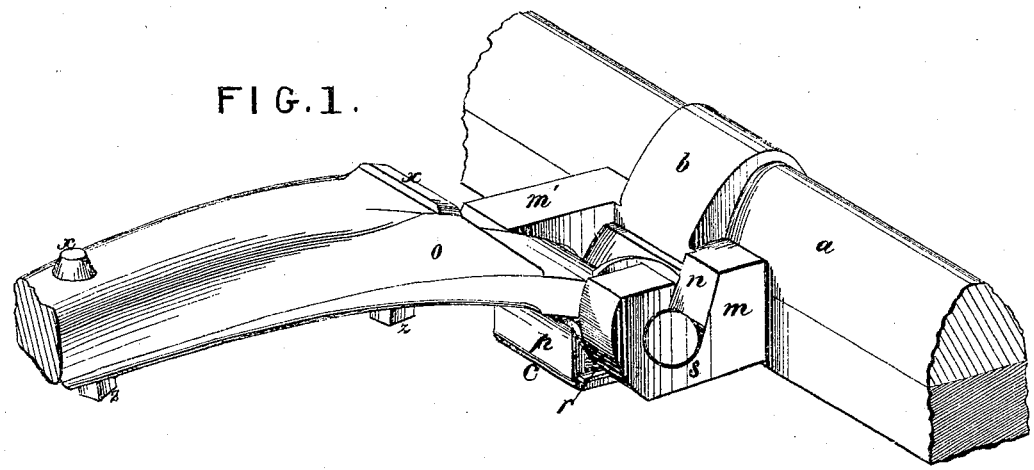
Figure 1 is a perspective view of part of an axle and thill-coupling embodying my invention.
Figure 2:
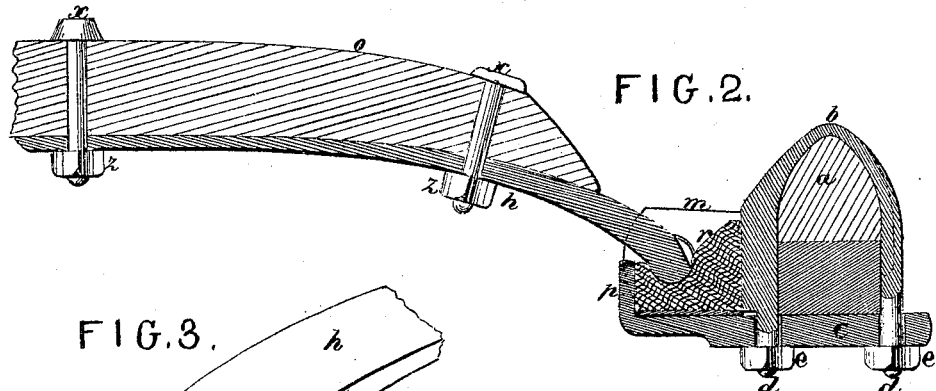
Fig. 2 is a longitudinal section of the same.

$a$ represents a portion of the axle of a vehicle to which my coupling is attached; $b$ is a clip passing over the axle, and provided at its lower ends with screw-bolts $d$ $d$, which pass through perforations in the plate $c$, the latter being securely fastened to the clip and axle by the nuts $e$ $e$, see Fig. 2. The front part of the plate $c$ is bent up as seen at $p$, thus forming a convenient seat for the rubber, $r$, between the projection $p$ and the front part of the clip $b$. $m$ $m'$ are projections forming part of the clip, and provided with perforations $s$ $s$, which serve as bearings for the trunnions $k$ $k$ of the head of the thill-iron $h$. One of the projecting ends $m$ is slotted at $n$ for the insertion of the head or pintle of the thill-iron into its bearings. $h$ is the thill-iron, securely fastened by the bolts $x$ $x$, provided with nuts $z$ $z$, to the thill $o$.

Figure 3:
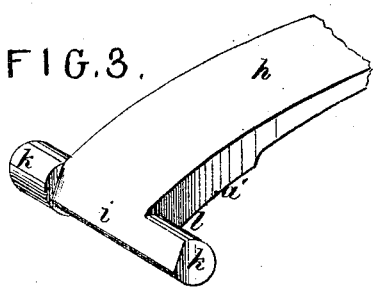
Fig. 3 is a perspective view of the thill-iron detached from the thill.
Figure 4:
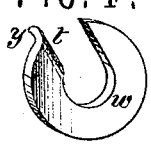
Fig. 4 is a detached view of the open washer or guard to secure the thill-iron head or pintle in its position.

A portion, $i$, of the lower part of the head of the thill-iron is flattened as seen at $i$, Fig. 3, to admit of the ready insertion of the head into its bearings, the head being slid therein, when the thill-irons are in a vertical or nearly vertical position, the flattening of the head at $i$, permitting the ready introduction of the thill-iron head into its bearings $s$ $s$. The part $l$ of the head of the thill-iron is made circular, so that when the thills are moved from their vertical position after the head has been inserted, the head will, from its eccentricity, bear upon the rubber $r$ in its seat, effectually binding or pressing it in its seat and preventing any liability of rattling, which is thus entirely obviated. To compensate for any wear of the rubber by the friction of the head of the thill-iron, the rubber may be removed, and any proper material placed under the rubber and between it and the bottom of the plate $c$. $w$ is a washer provided with an opening, $t$, and projection $y$, on one of its ends. The open washer $w$ is inserted in the slotted box $m$ $n$ $m'$ vertically between the rubber $r$ and the projection $m$, with the opening $t$, corresponding with the slot $n$ in the projection $m$, at the time of the introduction of the thill-iron head into its seat. After the thill-iron head has been placed in its bearings $s$ $s$, the thill being vertical, or nearly so, the thills are rotated to bring them to their ordinary position, when the part $a'$ of the thill-iron will be brought in contact with projection $y$ of the open washer $w$, causing it to rotate in its seat, and pass across and effectually bar the slot $n$, to prevent the withdrawal of the thill-iron head from its seat.

I am aware that thill-couplings have before been made with T-heads on the thill-iron, passing into slotted sockets on the clips and secured by turning the thills down into their operative position. This, therefore, I do not claim. The peculiarity in this part of my invention consists in forming a flat face or depression on that side of the T-head which comes in contact with the rubber cushion, when the shafts are elevated to be applied or detached, or a relative protuberance on the part which bears against the cushion when the shafts are lowered into their operative position, so that the spring-cushion will offer no obstruction in attaching or detaching the shafts, and will be efficient when they are in use.

Claims.

I claim as new and of my invention—

1. The combination of the thill-iron $h$, slotted box $m\ n\ m'$, and cushion $r$, arranged to prevent the escape of the head $i\ k\ l$ in a vertical direction, permit its insertion or withdrawal laterally when the thills are elevated, and cause it to compress the cushion by its own eccentricity when the thills are lowered into working position, all as set forth.

2. The open washer $w$ having the projection $y$, in combination with the thill-iron $h$ and slotted box $m\ u\ m'$, substantially as described.

To the above specification of my improvements in thill-couplings I have hereunto set my hand this 7th day of September, 1872.

JAS. H. PARKHURST.

Witnesses:
OCTAVIUS KNIGHT,
WALTER ALLEN.